No. 689,269. Patented Dec. 17, 1901.
W. P. WILLIAMS.
COTTON SEED HULL PRESS.
(Application filed Mar. 5, 1901.)
(No Model.) 3 Sheets—Sheet 1.
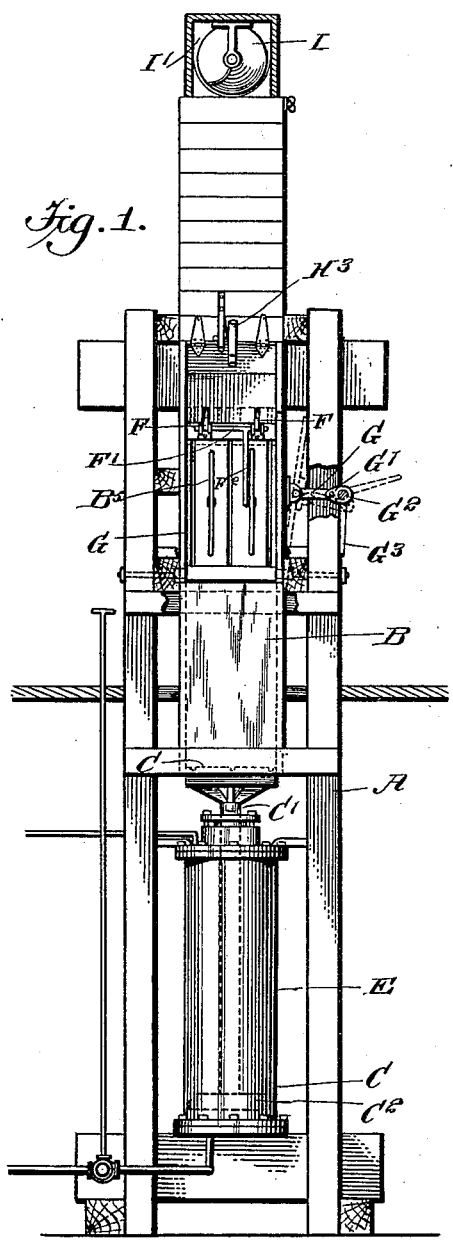
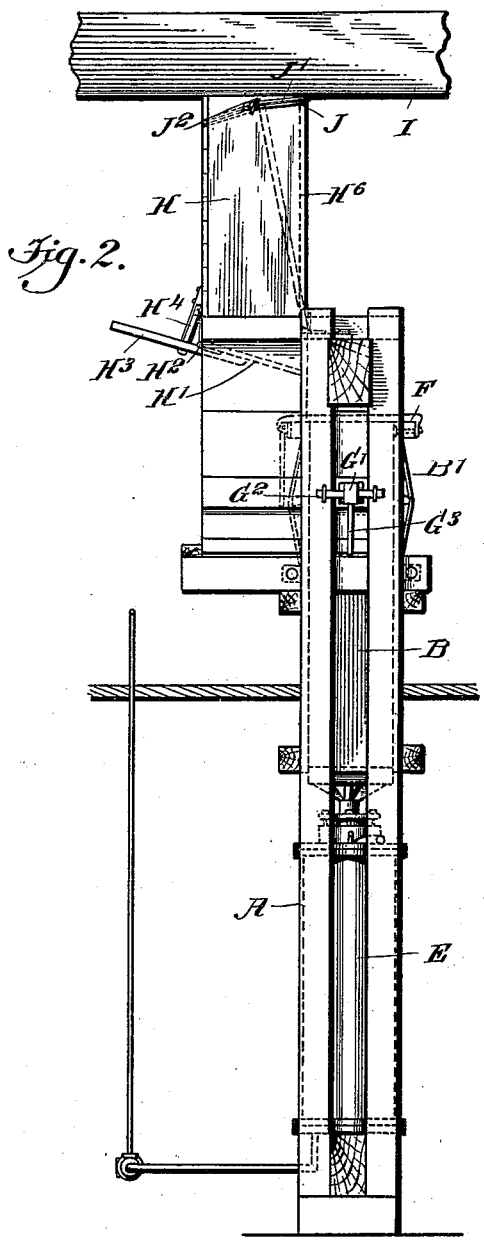
WITNESSES:
INVENTOR
William P. Williams
BY
ATTORNEYS No. 689,269. Patented Dec. 17, 1901.
W. P. WILLIAMS.
COTTON SEED HULL PRESS.
(Application filed Mar. 5, 1901.)
(No Model.) 3 Sheets—Sheet 2.
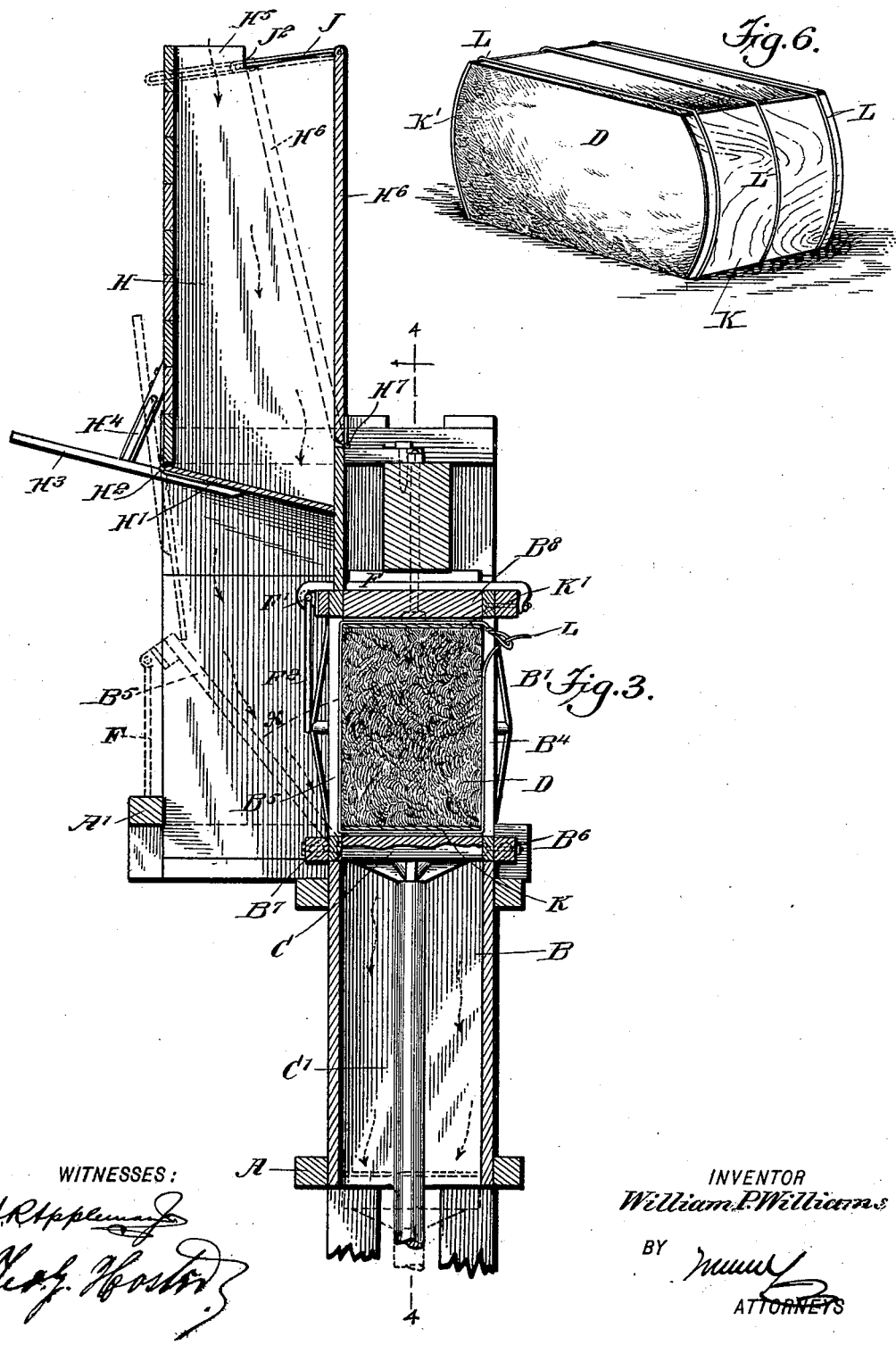

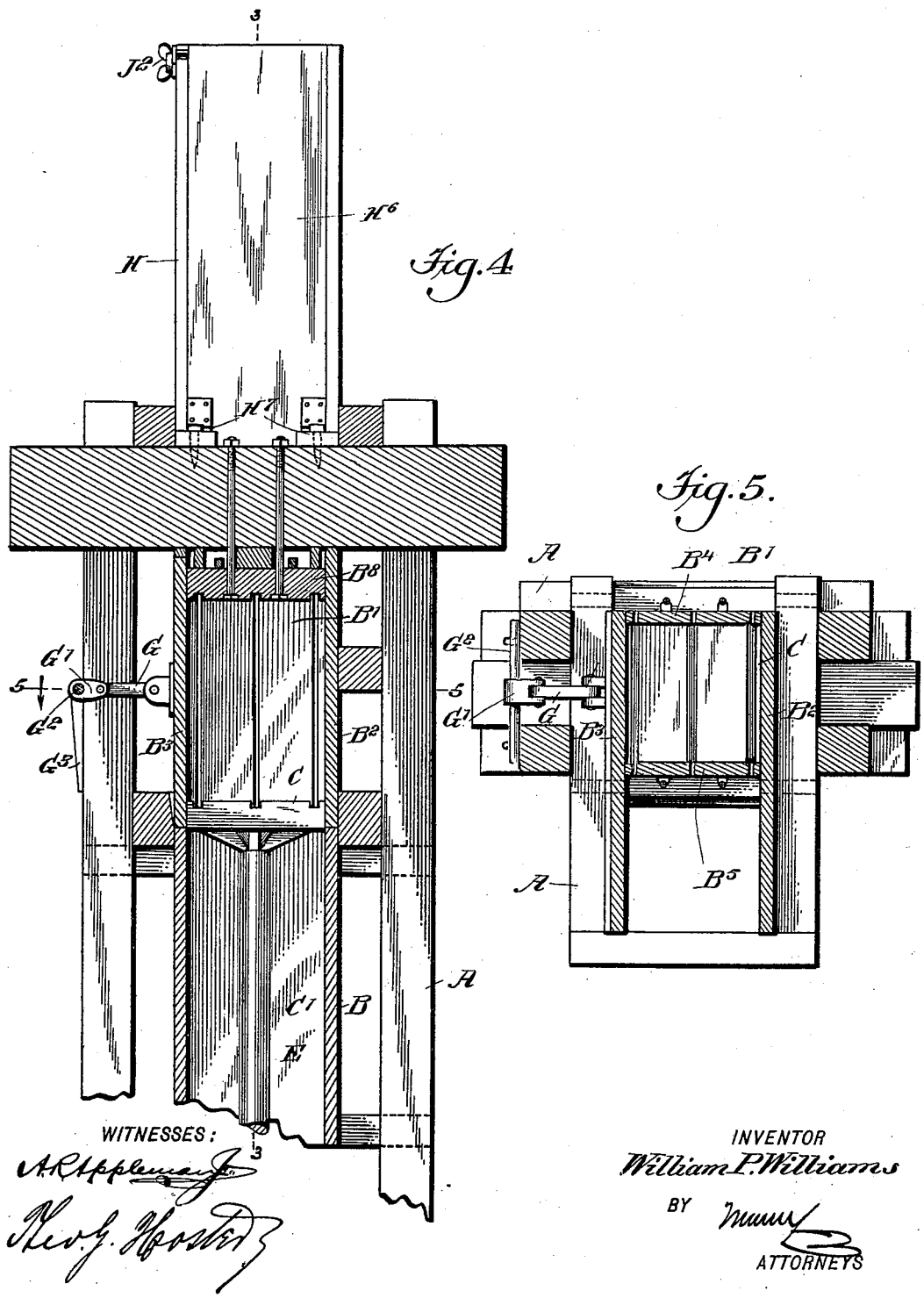

UNITED STATES PATENT OFFICE.

WILLIAM P. WILLIAMS, OF SPARTANBURG, SOUTH CAROLINA.

COTTON-SEED-HULL PRESS.

SPECIFICATION forming part of Letters Patent No. 689,269, dated December 17, 1901.

Application filed March 5, 1901. Serial No. 49,769. (No model.)

*To all whom it may concern:*

Be it known that I, WILLIAM P. WILLIAMS, a citizen of the United States, and a resident of Spartanburg, in the county of Spartanburg and State of South Carolina, have invented a new and Improved Cotton-Seed-Hull Press, of which the following is a full, clear, and exact description.

The object of the invention is to provide a new and improved cotton-seed-hull press which is simple and durable in construction, easily manipulated without the aid of skilled labor, and arranged to rapidly press the cotton-seed hulls into very compact bales without danger of the hulls scaling or crumbling from the bale when the latter is handled or in transit.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 1 is a front elevation of the improvement with parts broken out. Fig. 2 is a side elevation of the same. Fig. 3 is an enlarged sectional side elevation of the baling-chamber and adjacent parts, the section being on the line 3 3 in Fig. 4. Fig. 4 is a sectional rear elevation of the same on the line 4 4 in Fig. 3. Fig. 5 is a plan view of the same on the line 5 5 in Fig. 4, and Fig. 6 is a perspective view of the finished bale.

The improved press is mounted on a suitably-constructed frame A, which supports a baling-chamber B, disposed vertically, and in which reciprocates a follower C for pressing the cotton-seed hulls into a bale, as hereinafter more fully described. The follower C is secured to a piston-rod C', extending through suitable stuffing-boxes into a cylinder E, to connect with a piston $C^2$ therein, said cylinder being supported in the lower portion of the frame A, and connected with a suitable source of motive-agent supply to impart a reciprocating motion to the piston $C^2$, so as to cause the follower C to move up in the baling-chamber B and compress the cotton-seed hulls in the upper end B' of said chamber to form a bale D, the follower C then moving back to a lowermost position in the baling-chamber B. The upper end B' of the baling-chamber consists, essentially, of a fixed side $B^2$, a side $B^3$ in the shape of a door mounted to swing into an open position, a front $B^4$, and a back $B^5$, the latter being pivoted at their lower ends at $B^6$ and $B^7$ on the main frame A, as is plainly indicated in dotted lines in Fig. 3, said front $B^4$ and back $B^5$ being adapted to swing open and adapted to be locked in a closed position, as shown in Fig. 3, by hooks F, secured to the upper end of the front $B^4$, and extending transversely to hook upon a shaft F', journaled on the upper end of the back $B^5$ and provided with a depending arm $F^2$, arranged to rest on the beam A' of the main frame A when the back $B^5$ is swung into a rearmost position, as indicated in dotted lines in Fig. 3. The hooks F when disconnected from the shaft F' permit the front $B^4$ to swing into an open position and the back $B^5$ to swing into the inclined position above referred to.

The side $B^3$ is pivotally connected by a link G with an arm G', secured on a shaft $G^2$, journaled in suitable bearings in the main frame A, (see Fig. 5,) and on this shaft $G^2$ is held a depending arm $G^3$, adapted to be engaged by the operator to swing the same outward, and thereby cause the shaft G to turn so that the arm B' and the link G exert a pull on the side $B^3$ and swing the latter into an open position when it is desired to remove a finished bale from the head B', as hereinafter more fully described. The sides $B^2$ and $B^3$ are extended rearwardly, as is plainly shown in Figs. 3 and 5, for the back $B^5$ to extend between the extended portions of the said sides to form a feed-chute, of which the back $B^5$ is the bottom when said back is in an outermost position, as indicated in dotted lines in Fig. 3. The upper end of the feed-chute connects with the lower end of a receiving-hopper H, having a trap-door H', normally closed and connected by hinges $H^2$ to the back of said receiving-hopper. The trap-door is provided with a rearwardly-extending handle $H^3$, adapted to be engaged by a spring-arm $H^4$, supported on the back of the receiving-hopper H at one side of the handle and arranged to extend in the path of the handle when the trap-door is closed, so as to hold the trap-door H' normally in a closed position, as shown in Fig. 3. The upper end of said hopper H is provided with an inlet H⁵, opening into the bottom of the casing I' of a conveyer I, extending over said feed-chute and receiving the cotton-seed hulls at one end, to deliver said hulls to the receiving-hopper and fill the same while the door H' is closed. When the hopper is filled, then the cotton-seed hulls are carried by the conveyer beyond the hopper H to a suitable storage-compartment, so that the conveyer need not be stopped while the cotton-seed-hull press is inactive. The front H⁶ of the hopper H is hinged at its lower end at H⁷ to the main frame A, and on the upper free end of said front H⁶ is secured an arm J, formed with an elongated slot J', through which extends a clamping-bolt J² for fastening the slotted arm J securely in position after the front H⁶ has been swung inward or outward, according to the capacity desired to be given to the hopper H to form bales of a desired weight. Thus when the front H⁶ is moved inward into the position, for instance, as shown in dotted lines in Fig. 3, then it takes considerably less cotton-seed hulls to fill the hopper than when the front H⁶ is moved farther outward, and as the contents of the hopper are at once discharged through the feed-chute into the upper end B' to form a single bale it is evident that this bale is of more or less weight according to the amount of hulls contained in the hopper and according to the position of the front H⁶.

It is understood that when the follower C is in a lowermost position in the baling-chamber and the back B⁵ has been swung outward into the position shown in dotted lines in Fig. 3 and the operator releases the spring-arm H⁴ from the handle H³ and the hopper H is filled with cotton-seed hulls then the entire amount of cotton-seed hulls drops down through the feed-chute over the back B⁵ into the baling-chamber B and fills the same—say to the dotted lines indicated by x in Fig. 3. When this has been done, the trap-door H' is again closed, the back B⁵ is swung into a closed position to bring the cotton-seed hulls contained in the upper portion of the feed-box, the upper end of the head B', and the feed-chute completely into said head to nearly fill the same. The piston C² is now caused to travel upward, so that the follower C moves in a like direction and compresses the cotton-seed hulls in the baling-chamber to form a bale D. The front B⁴ and the back B⁵ of the head B' are preferably provided with suitable trusses for strengthening them.

In using the device baling-plates K K' are employed, of which the baling-plate K is placed in the baling-chamber on the top of the follower C previously to filling the baling-chamber with the cotton-seed hulls, as above explained, and the baling-plate K' is placed in the upper end B' on the top of the cotton-seed hulls after the same have been discharged from the hopper H through the feed-chute into the baling-chamber and its upper end, as above explained, and previous to closing the back B⁵. When the follower C rises, the baling-plate K is carried along and the baling-plate K' is pressed against the top B⁸ of the head B' and is bolted or otherwise secured to the frame A, as indicated in Fig. 4. The follower C and the top B⁸ are formed with the usual grooves for the passage of the bale wires or bands L, which also extend through slots in the front B⁴ and the back B⁵ to permit proper tying of the bale, and the bale-plates K K' to form the bale, as shown in Fig. 6.

After the bale has been finished the front B⁴ and the back B⁵, as well as the side B³, are swung open to permit of removing the finished bale from the head B' previous to returning the follower C to the lower end of the baling-chamber B. As soon as the bale is removed the front B⁴ and the side B³ are again closed, while the back B⁵ is left in an inclined position, the arm F² supporting the back, and thereby forming a back for the feed-chute, as indicated in dotted lines in Fig. 3. In the meantime the hopper H has filled with cotton-seed hulls, and the operator now again unlocks the trap-door H' and allows the same to swing into an open position, the lower end of the trap-door abutting against the upper end of the back B⁵ to close the feed-chute at the rear end and prevent spilling of the cotton-seed hulls as the same pass from the hopper H through the feed-chute into the baling-chamber and its head, as previously explained.

As shown in the drawings, these wires are used for binding the bale, the outside wires being located very near the edge of the bale to securely hold the hulls in place and prevent peeling off of the hulls.

Having thus fully described my invention, I claim as new and desire to secure by Letters Patent—

1. A press, comprising a baling-chamber having a back adapted to swing into an open position, a receiving-hopper having a trap-door, a feed-chute intermediate said receiving-hopper and said baling-chamber, to fill the latter from the receiving-hopper, the bottom of the chute being formed by said back when in an open position, and said trap-door forming the rear portion of said feed-chute when in an open position, as set forth.

2. A press, comprising a baling-chamber having one of its walls arranged to swing into an open position, a receiving-hopper having a trap-door, a feed-chute leading from the hopper to the baling-chamber, the bottom of the chute being formed by said wall of the baling-chamber when in an open position, the said trap-door when open forming a part of the said chute, and a conveyer opening into the said hopper, as set forth.

3. A press, comprising a baling-chamber having one of its walls adapted to swing into an open position, means for locking the said wall in the closed position, means for supporting the wall in the open position, a receiving-hopper having a trap-door, and a feed-chute intermediate said receiving-hopper and said baling-chamber, the said wall of the baling-chamber and the said trap-door when in the open position forming the rear portion and bottom of the feed-chute, as set forth.

4. A press, comprising a baling-chamber, a receiving-hopper having one of its walls hinged at its lower end the said wall being movable to regulate the capacity of the hopper, an arm secured on the upper free end of said wall and formed with an elongated slot, a clamping-bolt extending through said slot for fastening the arm in position, and a feed-chute for filling said baling-chamber from the receiving-hopper, as set forth.

5. A press, comprising a baling-chamber, a follower movable therein, a back for the upper end of said baling-chamber and arranged to stand at an angle thereto in an extension of the sides of the baling-chamber, said extended portion of the sides and said back forming a feed-chute for filling the baling-chamber with the material to be baled, and a receiving-hopper above said feed-chute and provided with a trap-door for retaining the material in said receiving-hopper when the trap-door is closed, said trap-door forming with said back the rear portion and bottom of the feed-chute, as set forth.

6. A press, comprising a baling-chamber, a follower therein, a cylinder, a piston movable in said cylinder and having its piston-rod connected with the said follower, a back for the upper part of said baling-chamber adapted to swing into an open position, means for supporting said back in the open position, a receiving-hopper provided with a trap-door, and a feed-chute intermediate said receiving-hopper and said baling-chamber, the bottom of said chute being formed by said back when in an open position, and the end of said trap-door, when the latter is opened, engaging the upper end of the said back, as set forth.

7. A press, comprising a baling-chamber, a receiving-hopper, a feed-chute for filling said baling-chamber from said receiving-hopper a trap-door normally closing the lower part of the hopper, the said trap-door being provided with a rearwardly-extending handle, and a spring-arm supported on the back of the receiving-hopper at one side of the handle and arranged to extend in the path of the handle when the trap-door is closed, as set forth.

In testimony whereof I have signed my name to this specification in the presence of two subscribing witnesses.

WILLIAM P. WILLIAMS.

Witnesses:
  M. B. CRIGLER,
  J. E. MORGAN.